United States Patent [19]

Leitzke et al.

[11] Patent Number: 4,656,010
[45] Date of Patent: Apr. 7, 1987

[54] DEVICE FOR PRODUCING OZONE

[75] Inventors: Ortwin Leitzke, Kaartz; Ewald Wolf, Karben, both of Fed. Rep. of Germany

[73] Assignee: Messer Griesheim GmbH, Fed. Rep. of Germany

[21] Appl. No.: 727,548

[22] Filed: Apr. 26, 1985

[30] Foreign Application Priority Data

Jun. 22, 1984 [DE] Fed. Rep. of Germany ....... 3422989

[51] Int. Cl.$^4$ ............................................. B01J 19/08
[52] U.S. Cl. ........................... 422/186.18; 422/186.19; 422/186.04
[58] Field of Search ...................... 422/186.07, 186.18, 422/186.19, 186.2; 204/176

[56] References Cited

U.S. PATENT DOCUMENTS

| 3,214,364 | 10/1965 | Van Tuyle et al. | 422/186.19 |
| 3,671,417 | 6/1972 | Louboutin | 422/186.18 |
| 3,677,931 | 7/1972 | O'Hare | 422/186.18 |
| 3,942,020 | 3/1976 | Ciambrone | 422/186.18 |
| 3,967,131 | 6/1976 | Slipiec et al. | 422/186.18 |

FOREIGN PATENT DOCUMENTS 0205306 12/1982 Japan ............................ 422/186.18

Primary Examiner—John F. Terapane
Assistant Examiner—Susan Wolffe
Attorney, Agent, or Firm—Harold Pezzner

[57] ABSTRACT

A device for producing ozone is characterized by an inner electrode made from a plurality of metal wires. Accordingly, the diameter of the outer electrode is correspondingly reduced. The ratio of the outer diameter electrode to the inner diameter electrode is greater than two.

9 Claims, 3 Drawing Figures

DEVICE FOR PRODUCING OZONE

BACKGROUND OF THE INVENTION

Ozone is a very powerful oxidizing agent for organic substances and for inorganic compounds which contain elements with several oxidation levels. Beside multiple applications in the field of chemistry, it has been introduced decades ago in the field of water treatment. The high costs of investment and operation, however, restrict the application possibilities.

Even though there are, theoretically, many possibilities for producing ozone, only the production of ozone by silent electrical discharges has gained any significance. This is true for large stationary ozone producing installations as well as for small transportable ones. Ozone producing devices which operate according to this principle consist essentially of two electrodes which are separated from one another by a dielectric and a gas chamber. A high voltage alternating current is applied to the electrodes. A the same time, one allows oxygen or an oxygen containing gas to flow through the gas chamber. A high voltage electrical discharge hereby occurs between the electrodes without the formation of sparks and without bright light displays. This high voltage discharge leads to ozone formation. Two types of ozone producing devices which use this principle are known, namely, plate type ozone producing devices according to which the electrodes consist of parallel plates, and tubular ozone producing devices according to which the electrodes consist of concentric tubes. The invention is concerned with the latter type of ozone producing devices.

Numerous constructions of tubular ozone producing devices are known; German patents DE-PS No. 17 67 109 and DE-PS No. 32 21 895 show examples of typical constructions. Many efforts have been directed toward improving the efficiency of ozone producing devices, especially by increasing the intensity of the field. In order to accomplish this purpose, for example, the surface of the electrodes has been roughened with a coating as disclosed in DE-PS No. 12 40 831 or the dielectric was equipped with electrically conductive islands as disclosed in EU-PS No. 00 19 307. Special constructions have also become known. For example, EU-PS No. 00 18 318 discloses an inner electrode which consists of wire wound around a cylindrical core while the outer electrode is designed, in the usual manner, as a tube. DE-PS No. 156,531, on the other hand, discloses a spiral wound outer electrode and an inner electrode which is designed as a tube or as a rod.

Spiral shaped electrodes require, because of their construction, relatively large discharge chamber/spaces and, for this reason, yield low and irregular discharge densities as well as low ozone concentrations. Furthermore, in the case of spiral shaped outer electrodes, cooling with liquid is not possible when the gap between the outer electrode and the dielectric is to be used as a discharge chamber.

With the ozone producing device in usage today, high voltages discharge electrodes are the predominant type being used. These have either a metallized dielectric made from, for example, glass, ceramic or plastic, or else from metal plates or metal tubes coated with the dielectric. The high voltage is thus applied to the metallic layer. A directly or indirectly cooled electrode, which can, in certain cases, also carry a dielectric coating, is usually opposite the high voltage discharge electrode. The heat resulting from the gaseous discharge is supposed to be channeled away via the cooling medium. With a good cooling system, the yield of ozone can be increased. For this reason, attempts are made in many cases, to cool the high voltage electrode by means of a second, expensive cooling circuit.

With the prevailing constructions, the heat occurring as a result of the silent electrical discharge can only be carried to the cooled outer electrode by diffusion and convection. Because of the relatively low field strength during ozone production, the gas discharge path can only be impacted at relatively high gas volumes and at very low velocities. At these low gas velocities, the amount of heat transferred is practically equal to zero so that no heat can be carried off via the flowing gas. Unlike, as with plate ozone producing device, with tubular ozone producing devices, one is faced with great difficulty in assuring the maintenance of an exact distance. This is primarily caused by fluctuations in the diameter of the tube as well as by bends. It is thus not possible, even with the use of centering elements, to keep the tube's distance constant over the entire length. Because of the rigidity of the tubes, which have diameters of 30 mm or more, an elastic reshaping by means of the centering elements is also not possible. As a result of these inaccuracies, highly varied discharge densities occur which, in turn, lead to considerable reductions of the ozone yield.

SUMMARY OF INVENTION

The object of the invention is to improve the discharge densities and the gas flow of ozone producing devices by means of construction improvements so that the specific energy required for the production of ozone is reduced.

The invention is characterized by an inner electrode in the form of a small diameter solid cylindrical metal rod thereby permitting the outer electrode diameter to be reduced but to still be at least twice as great as the inner electrode diameter.

As a result of the small diameters of the inner and outer electrodes a capacity smaller than was previously the case with ozone producing devices is obtained whereby the current requirement is reduced. Aside from this, the velocity of the gas is increased whereby the cooling is improved. Since, according to the invention, the inner electrode is designed as a single or stranded rod, the diameter of the outer electrode can be considerably reduced as compared to known constructions; the inner diameter of the outer electrode amounts to only, for example, 5 to 10 mm. The inner electrode can, for example, consist of wire with a diameter of 0.5 to 3 mm. The inner electrode can be exposed to a maximal field strength without any reservations. A smaller radius of curvature results in a greater field strength. The invention's tubular ozone producing device allows the retention of the advantageous features of known constructions. Furthermore, materials with a high electrical insulation value can be used as, for example, glass, plastic, aluminum oxide or titanium oxide. The outer electrode, as the opposing electrode to the inner high voltage electrode can be surrounded by a metal tube with an added dielectric. It can also be formed from a plastic tube on the outside of which flows an electrically conductive liquid. The electrically insulating plastic is hereby the dielectric. The outer electrode can also consist of a metallic layer applied onto plastic. This construction is particularly advantageous when combined with an inner electrode made of wire because, as a result of this, very long ozone producing elements can be formed without losing the accuracy of the gap between the inner and the outer electrodes, even with the preferred very small gaps of under 1 mm. Such ozone producing elements can also be made so as to be flexible. They can then, for example, be sharply bent and handled, wound as yard goods. In this case, a spiral shaped band wound and glued onto the inner electrode is particularly suited as a spacer. Aside from maintaining the precision, the velocity of the gas is thus also increased and cooling is improved.

THE DRAWINGS

FIG. 3 is a cross-sectional view of an inner electrode with a spiral wound spacer.

DETAILED DESCRIPTION

Figure 1:
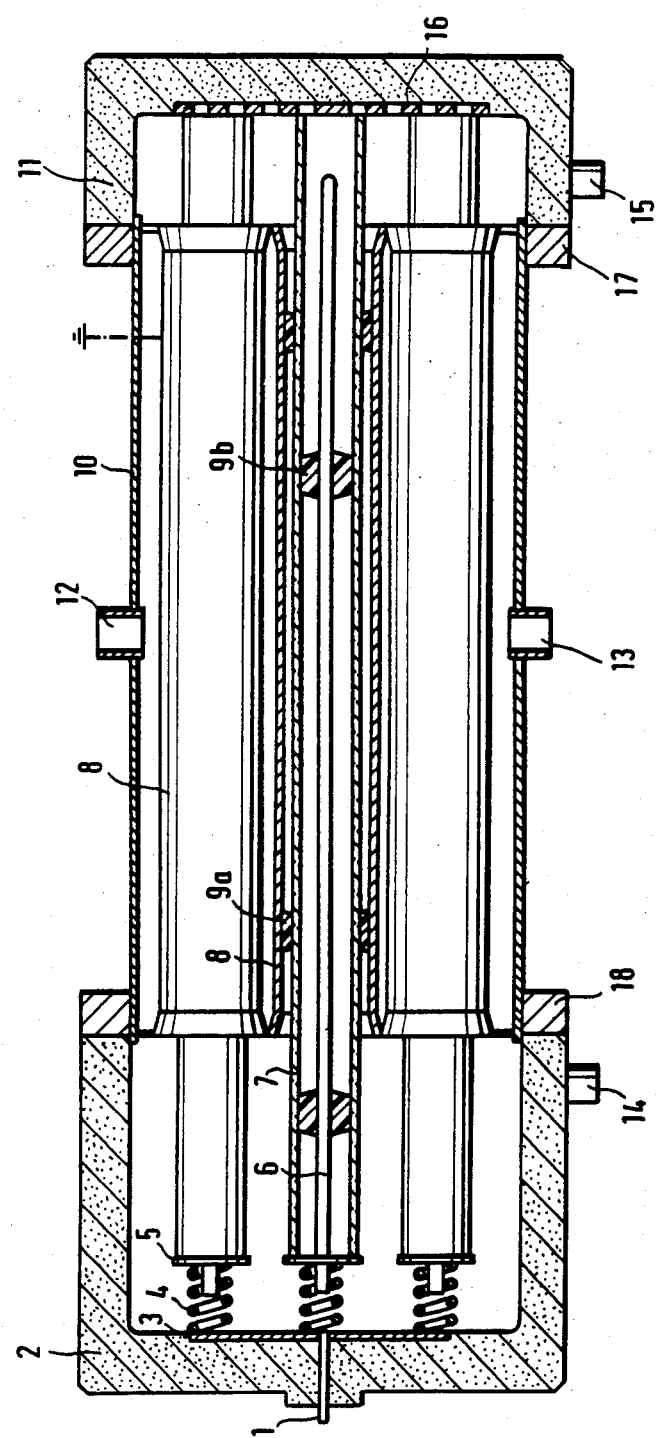
FIG. 1 is a cross-sectional view of a device with a straight ozone producing element.

Like reference numerals are used for like parts in the various figures.

With the device shown in FIG. 1, the high voltage lead 1 passes through the head piece 2, which is made of an insulating, oxygen and ozone resistant material, via the distributor plate 3, the transmission springs 4 and the retainer springs 5 to the inner electrode 6 which consists of wire. The inner electrode 6 which carries the high voltage is surrounded by the dielectric 7 and the outer electrode 8. The spacers 9a and 9b assure an exact maintenance of distance between the inner electrode 6, the dielectric 7 and the outer electrode 8. The outer electrodes 8 are open in the form of a hexagon at their ends and are welded with their sides flush and without an end plate/floor plate. The device contains a total of five ozone producing elements, consisting of an inner electrode 6, a dielectric 7 and an outer electrode 8 which are surrounded by the tubular cooling jacket 10. The tubular cooling jacket 10 is connected to the head piece 2 and the bottom piece 11 by means of the screw joints 17 and 18. Cooling water is supplied by means of the nipple 12 and exhausted by means of the nipple 13. Oxygen is supplied via the connection 14 and the generated oxygen-ozone blend drawn off via the connection 15. The tubes forming the dielectric 7 are supported on a plate 16 which is equipped with grooves and is located in the bottom piece 11.

The oxygen enters through the connection 14 and is distributed in the head piece 2. It flows through the gaps which are formed by the inner electrode 6, the dielectric 7 and the outer electrode 8. The retainer springs 5 and the spacers 9a and 9b are designed so as to permit the passage of oxygen through the gap. As a result of the silent electrical discharges which take place between the inner electrode 6 and the outer electrode 8, ozone is formed from a portion of the oxygen. The ozone-oxygen mixture collects in the bottom piece 11 whereby the gas flowing inside the dielectric 7 reaches the bottom piece via the grooves in the plate 16. The mixture is drawn off via the connection 15. The high voltage is applied at the high voltage lead 1, is distributed on the distributor plate 3 and is transmitted from there, via the transmission springs 4 and the retainer springs 5 which are in contact with the inner electrodes to a total of five inner electrodes 6. Any number of such devices can, if desired, be connected in parallel and operated.

Figure 2:
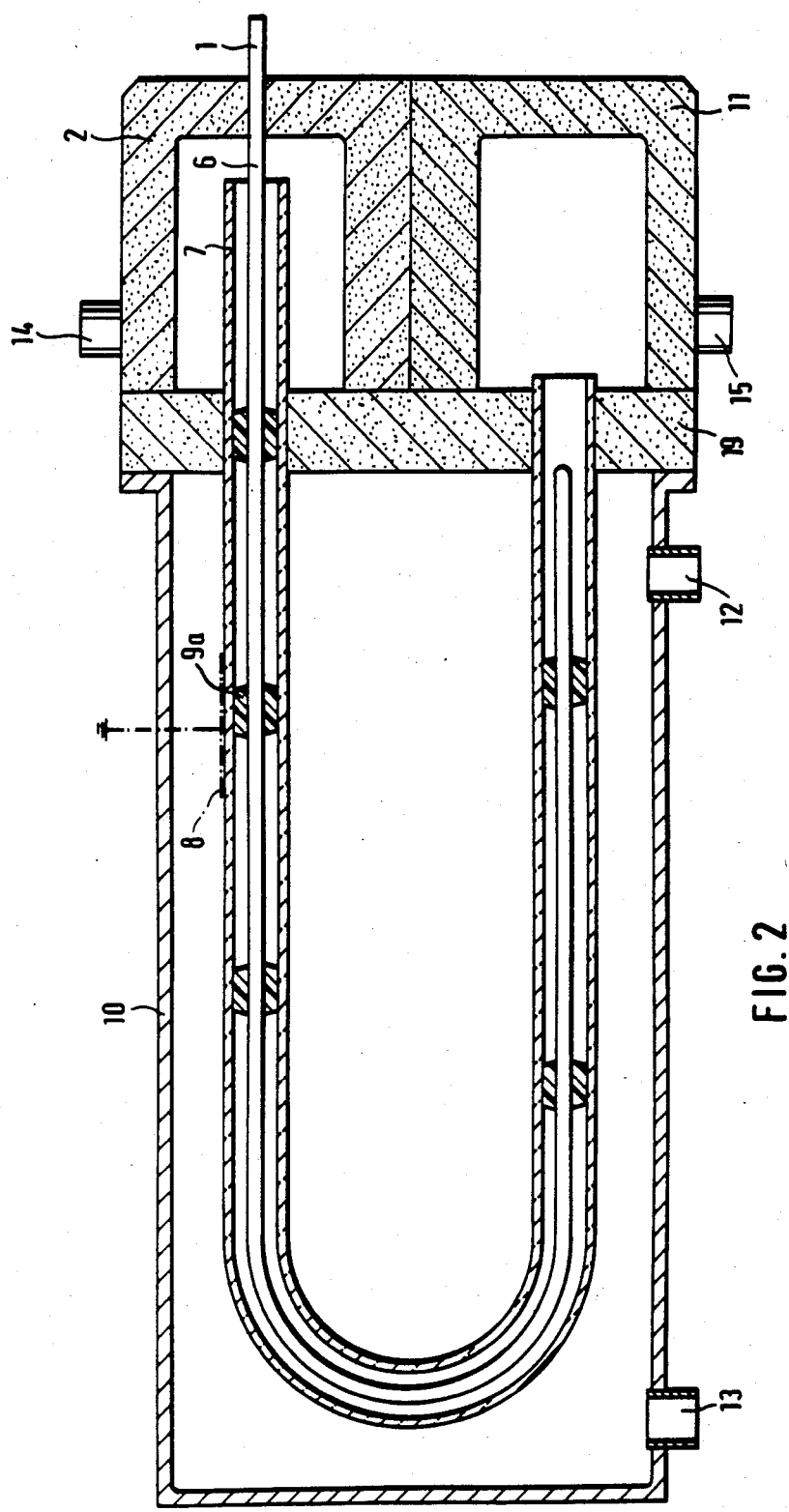
FIG. 2 is a cross-sectional view of a device with a wound ozone producing element.

The device according to FIG. 2 differs from the device according to FIG. 1 mainly in that the ozone producing element, which consists of the inner electrode 6, the dielectric 7 and the outer electrode 8, is flexible and is placed in a curved fashion in the cooling medium. The outer electrode 8 is thereby a metallic layer applied to the dielectric 7. A precisely constant distance is again assured by means of the spacer(s) 9a. The head piece 2 and the bottom piece 11 are attached to a common foundation plate 19. The head piece 2 and the bottom piece 11 can also be made of one piece.

FIG. 3 shows an inner electrode 20 with two parallel spirally wound plastic bands 21 as spacers for the plastic hose 22 which serves as the dielectric and has a metallic outer electrode 23 which is vapor-deposited on it. A slipped on thin walled metallic tube can also serve as an outer electrode. In this case, the metallic tube can likewise be separated from the plastic hose by a glued on spiral plastic band serving as a spacer.

As the embodiments according to FIGS. 1 and 2 show, the inventive device is inexpensive to produce because complicated gaskets and centering components are not necessary. Since the discharge chambers are open on both sides, an intensive gas cooling is possible. The electrodes form narrow and precise discharge gaps and have a small diameter. As a result of this, high gas velocities and an improved cooling effect occur. No expensive special profiles are required; the dielectric tubes, in particular, can be made from commercially available tubes of glass, aluminum oxide or titanium oxide. Commercially available tubes and wires can even be used for the electrodes provided they already have a high degree of precision. Long ozone producing elements, as for example 2.5 m long, can be formed without difficulties and with the aid of spacers. The overall dimensions of the ozone producing device become smaller. Instead of expensive vapor-deposited aluminum mirror-coatings, ordinary wire can be used for the high voltage electrode. Even at an electrical frequency of only 50 Herz, the specific energy consumption for producing 1 Kg of ozone is low.

This is shown by the following data for the operation of an ozone producing device according to the invention:

9 KWh/1 Kg at a concentration of 100 g/m$^3$
8 KWh/1 Kg at a concentration of 100 g/m$^3$
7 KWh/1 Kg at a concentration of 100 g/m$^3$
6.7 KWh/1 Kg at a concentration of 100 g/m$^3$
6.3 KWh/1 Kg at a concentration of 100 g/m$^3$
6.0 KWh/1 Kg at a concentration of 100 g/m$^3$

SUMMARY

In the case of tubular ozone producing devices which each consist of a concentrically configured tubular outer electrode, a tubular inner electrode and a tubular dielectric located between both electrodes, one encounters difficulties in maintaining the distance between the tubes constant over the entire length. Because of the irregularities present, fluctuating discharge densities with correspondingly worse ozone outputs occur.

For the purpose of increasing the equalizing the field intensity, the inner electrode 6 is designed as a solid metal rod. Because it has a small diameter as compared to that of a tube, the field strength is great. Since the diameter of the outer electrode 8 is correspondingly reduced and thinner material gauges are used, an elastic construction results. The distance between the outer and inner electrodes as well as dielectric 7 can be kept constant over the entire length in a precise manner. This results in a constant intensity of the field strength, good cooling potential, a compact construction and a high efficiency.

What is claimed is:

1. In a device for producing ozone from oxygen or oxygen containing gas by means of static electrical discharge in a space through which the gas flows, which space is essentially formed by a tubular outer electrode and a voltage carrying inner electrode surrounded by the outer electrode whereby a dielectric which separates the electrodes is installed in this space, the improvement being in that said inner electrode consists of a plurality of metal wires, and that ratio of the diameter of said outer electrode to the diameter of said inner electrode being greater than 2.

2. Device according to claim 1, characterized therein that said plurality of metal wires consist of several stranded rod.

3. Device according to claim 1, characterized by a precise concentric configuration of said inner electrode and said dielectric and said outer electrode by means of spacers.

4. Device according to claim 3, characterized therein that said spacers are in the form of at least one spiral glued-on plastic band installed on said inner electrode.

5. Device according to claim 1, characterized therein that the common axis of said inner electrode and said dielectric and said outer electrode is curved.

6. Device according to claim 1, characterized therein that said inner electrode and said dielectric and said outer electrode are connected in parallel with a common head piece for the oxygen or oxygen rich gas and a common bottom piece for the generated ozone containing gas.

7. Device according to claim 1, characterized therein that said inner electrode consists of wire with a diameter of 0.5 to 3 mm.

8. Device according to claim 3, characterized therein that said dielectric is made of glass.

9. Device according to claim 3, characterized therein that said dielectric is made of plastic.

* * * * *